United States Patent Office 3,183,054
Patented May 11, 1965

3,183,054
ALDEHYDE CONDENSATION PRODUCTS AND THEIR USE IN TREATING FIBROUS MATERIALS
Rudolph F. Fischer, Oakland, and Curtis W. Smith, Berkeley, Calif., assignors to Shell Oil Company, a corporation of Delaware
No Drawing. Filed July 24, 1959, Ser. No. 829,211
12 Claims. (Cl. 8—94.33)

This invention relates to a new class of condensation products and to a method for their preparation. More particularly, the invention relates to novel condensation products prepared from unsaturated aldehydes, to their preparation and to the use of the new condensation products, particularly for the treatment of fibrous materials.

Specifically, the invention provides new and particularly useful condensation products prepared by reacting an aldehyde having attached to or involving a carbon atom alpha or beta to the

group a functional group containing oxygen, nitrogen or sulfur, or an aliphatic carbon-to-carbon unsaturated linkage, such as, for example, acrolein, with an aldehyde having the

group or groups as the only functional group, such as, for example, formaldehyde and glutaraldehyde, in an acidic medium.

As a special embodiment, the invention provides a process for utilizing the above-described new condensation products for the treatment of fibrous materials, such as, for example, textile fabrics, paper, leather and the like. This process comprises impregnating the fibrous material with an aqueous medium containing the above-described condensation products and an acidic catalyst and then heating the treated material.

Cellulosic fabrics, such as cotton and rayon, have rather poor resilience, i.e., they are easily creased or wrinkled when crushed or otherwise subjected to localized physical force. In addition, many of these fabrics have poor dimensional stability as exemplified by poor resistance to shrinkage. In order to overcome these shortcomings, it has been common practice to treat the fabric with a resin, such as a urea- or melamine-formaldehyde resin, that could be subsequently insolubilized within the fabric fibers. The results with these materials have not been entirely satisfactory, particularly with white goods. In many cases, the materials impart chlorine-retentive properties which cause discoloration on exposure to heat. Furthermore, in many cases large amounts of resin are needed to obtain the desired crease recovery. This makes the treatment uneconomical as well as, in many cases, affecting feel and hand of the fabric. In addition, many of the fabrics treated with these resins tend to lose their strength and are easily torn. Furthermore, fabrics treated with these resins have poor washability, i.e., the resin is easily lost from the fabric after a few washings with soap and water.

Similar problems have been found in the preparation of paper products. Ordinary paper when wet loses its strength and is easily torn. In order to overcome this shortcoming, it has also become common practice to treat the paper with nitrogen-containing resins, such as urea- or melamine-formaldehyde resin, that can be subsequently cured to form an insoluble resin. While this method has imparted some improvement in wet strength, it still fails to give a product having properties required for many commercial applications. The wet strength provided by this method, for example, is sometimes not as high as desired. In addition, the improvement in wet strength is only temporary and is readily lost after short periods of exposure to water. This defect is particularly serious as it prevents continued use of the paper or use for applications as food wrappers or containers, etc. In addition, the paper treated in this manner generally loses its customary feel, becomes quite brittle, loses some of its absorbency. Furthermore, paper treated in this manner also has poor resistance to acids and/or alkali and are unsuited for use when the paper must come in contact with these chemicals.

Related problems are also found with other fibrous materials, such as leather and the like. In the case of leather it is highly desirable to find materials that give the leather a permanent tanning effect rather than one that is lost after exposure to moisture, acids and alkali.

It is an object of the invention, therefore, to provide a new class of condensation products that are particularly useful for the treatment of fibrous materials. It is a further object to provide new condensation products from unsaturated aldehydes and a method for their preparation. It is a further object to provide new condensation products from unsaturated aldehydes that, even when used in small amounts, are particularly useful for imparting crease resistance (in both wet and dry state) to textile fabrics. It is a further object to provide new materials that impart crease and shrink resistance to textiles without unduly affecting strength. It is a further object to provide new condensation products that impart no chlorine-retentive properties to treated fabrics. It is a further object to provide new condensation products that can be used to impart improved wet strength and abrasion resistance to paper. It is a further object to provide new condensation products that are particularly useful for treating leather to impart a high degree of resistance to detanning by acids and alkali. It is a further object to provide a process for using the new condensation products for the treatment of fibrous materials. It is a further object to provide a new process for imparting crease and shrink resistance to textile fabrics. It is a further object to provide a new process for treating paper to impart improved wet strength and abrasion resistance. It is a further object to provide a process for treating leather. Other objects and advantages of the invention will be apparent from the following detailed description thereof.

It has now been discovered that these and other objects may be accomplished by the new condensation products of the invention which are prepared by reacting an aldehyde having attached to or involving a carbon atom alpha or beta to the

group a functional group containing oxygen, nitrogen or sulfur, or an aliphatic carbon-to-carbon unsaturated linkage, such as, for example, acrolein, with an aldehyde having the

group or groups as the only functional group, such as, for example, formaldehyde and glutaraldehyde, in an acidic medium. The new products have been found to be particularly outstanding materials for treating fibrous materials as they impart many improved properties thereto. It has been found, for example, that textile fabrics, such as cellulosic materials as cotton and rayon, treated with even very small amounts of the above-described condensation products have greatly improved crease resistance in both wet and dry state. Furthermore, this is accomplished without causing a loss of the other desired properties such as hand, strength and the like. Further advantage is also found in the fact that the treated fabric is non-chlorine retentive and can be subjected to bleach and heat without discoloration. Woolen fabrics treated with the aqueous solution of the new condensation products have improved shrink resistance and resistance to matting. The new products are also useful in imparting improved resistance to fraying, pilling and improved dyeability to the synthetic type fabrics, such as the nylons, dacrons and the like.

The new condensation products have also been found to be of value in the treatment of other fibrous materials, such as paper, leather and the like. Paper treated with the new products have improved wet strength and improved abrasion resistance, while the treatment of leather permits greater retention of tanning properties.

The first group of aldehyde reactants used in making the new condensation products of the present invention include those aldehydes having attached to or involving a carbon atom alpha or beta to the $$\overset{H}{\underset{}{C}}=O$$

group a functional group containing oxygen, nitrogen or sulfur, or an aliphatic carbon-to-carbon unsaturated linkage. Examples of these include, among others, 2-hydroxypropionaldehyde, 3-hydroxypropionaldehyde, 2-hydroxybutyraldehyde, 3-hydroxybutyraldehyde, 3-mercaptopropionaldehyde, 3-aminopentanal, 2-mercaptohexanal, 2-aminododecanal, 3-hydroxycyclohexanal, acrolein, methacrolein, crotonaldahyde, alpha-phenylacrolein, alpha-cyclohexylacrolein, 2-pentenal, 3-hexenal, 2-decenal, 2-cyclohexenal and 2-hydroxy-3-mercaptotetradecanal.

Preferred members of the above group of aldehydes include the alpha-hydroxy substituted aliphatic and cycloaliphatic monoaldehydes, the alpha-amino substituted aliphatic and cycloaliphatic monoaldehydes, the alpha-mercapto substituted aliphatic and cycloaliphatic monoaldehydes, the alpha,beta-ethylenically unsaturated aliphatic and cycloaliphatic monoaldehydes, the beta-hydroxy-substituted aliphatic and cycloaliphatic monoaldehydes, the beta-amino substituted aliphatic and cycloaliphatic monoaldehydes, the alpha-mercapto substituted aliphatic and cycloaliphatic monoaldehydes, and the beta,gamma-ethylenically unsaturated aliphatic and cycloaliphatic monoaldehydes, the total number of carbon atoms in each case not exceeding 14. Also preferred are the above-noted substituted alkanals, cycloalkanals and alkenals and cycloalkenals containing up to 12 carbon atoms.

The preferred members may be exemplified by the following formulae

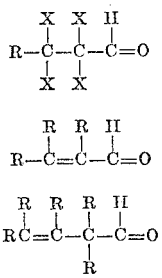

wherein at least one and preferably 1 to 2 X's is or are an OH, SH or $NH_2$ or alkyl substituted amino group, and the other X's not so occupied is or are a R. R is a member of the group consisting of hydrogen atom and hydrocarbon radicals, and preferably aliphatic and cycloaliphatic hydrocarbon radicals containing up to 12 carbon atoms.

Coming under special consideration are the ethylenically unsaturated aldehydes, particularly because of the outstanding properties of the resulting condensation products in the treatment of textile fabrics. These include, among others, the alpha,beta-ethylenically unsaturated monoaldehydes and the beta,gamma-ethylenically unsaturated monoaldehydes, such as acrolein, methacrolein, crotonaldehyde, alpha-cyclohexylacrolein and the like.

The second aldehyde reactant to be employed in preparation of the new condensation products of the present invention include the dissimilar aldehydes having the aldehyde group or groups as the only functional group. Examples of these unsubstituted mono- and polyaldehydes include, among others, formaldehyde, and materials which engender formaldehyde, such as formalin, paraformaldehyde, trioxane, methylal and the like, acetaldehyde, butyraldehyde, pentanal, hexanal, octanal, dodecanal, cyclohexanal, 2,4-dimethylcyclohexanal, glyoxal, succinaldehyde, glutaraldehyde, 1,8-octanedial, benzaldehyde, adipaldehyde, 3,5-diethylhexanal and the like.

Preferred members of this second group include, formaldehyde and materials which engender formaldehyde, aliphatic and cycloaliphatic saturated monoaldehydes and aliphatic and cycloaliphatic saturated di- and tri-aldehydes containing no more than 12 carbon atoms.

Formaldehyde comes under special consideration, particularly because of the superior products prepared therefrom as to the treatment of cellulosic textiles. Ethylenically unsaturated aldehydes used in the process are preferably the alpha,beta-mono-ethylenically unsaturated aliphatic, cycloaliphatic or aromatic aldehydes, such as acrolein, methacrolein, crotonaldehyde, alpha,phenylacrolein, alpha-cyclohexylacrolein, 2-pentenal and the like and mixtures thereof.

Formaldehyde may be employed in any of its forms in making the new products. This includes, for example, formalin, para-formaldehyde, trioxane and methylal.

The amount of the unsaturated aldehyde and the formaldehyde to be employed will vary within certain limits. The unsaturated aldehyde and formaldehyde may, for example, be combined in mol ratios varying from say 8:1 to 1:8. Particularly outstanding results are obtained when the aldehyde and formaldehyde are combined in mol ratios varying from 4:1 to 1:4 and more preferably in mol ratios varying from 1:1 to 2:1.

The reaction between the above-described aldehyde reactants is accomplished in an acidic medium. It is preferred to have the reaction medium at a pH between .5 to 6, and still more preferably between .5 to 3. This can be accomplished by the addition of a variety of acidic or acid forming materials, such as, for example, sulfuric acid, alkane sulfonic acids, phosphoric acid, acid metallic halides, such as zinc chloride, stannic chloride, aluminum chloride, acid clays, etc. The concentration of the acids employed and amount added will depend on the particular ingredient selected and the acidity desired. It is generally preferred to utilize moderately strong acids, such as sulfuric acid in concentrations ranging from about 20% to 60% by weight.

When the first type of aldehyde to be employed is an ethylenically unsaturated aldehyde, water should be employed in the reaction. In other cases, water may be employed and is sometimes very desirable. The use of water is particularly desirable as the reaction product may then be used directly in the reaction medium for the treatment of textiles as noted hereinafter. If desired other diluents, such as alcohols, tetrahydrofuran, dimethyl sulfoxide, and the like and mixtures thereof may also be employed.

Temperatures employed may vary over a wide range. As the reaction is exothermic cooling should generally by employed to keep the temperature within the desired range. Preferred temperatures range from about 0° C. to 80° C., and more preferably temperatures range from 10° C. to 50° C. Superatmospheric, atmospheric or subatmospheric pressures may be used as desired.

After the reaction has been completed, the mixture is then neutralized by the addition of suitable basic materials, and then any excess reactants are preferably removed by means, such as distillation, extracting with suitable solvents, such as petroleum ether, chloroform and the like.

The new condensation products prepared by the process of the invention are substantially odorless and colorless fluid liquids to viscous liquids to semi-solids. They are water-soluble and in emulsions are compatible with various oils, resins and the like. Analytical analysis shows the products to have OH and carbonyl values. Spectroscopic analysis indicates a hemiacetal structure.

The new condensation products may be used for a variety of important applications. They may, for example, be used in the preparation of aqueous surface coating compositions or impregnating compositions or may be cross-linked to form castings and pottings and the like.

The products are particularly useful, however, for the treatment of fibrous materials, such as textile fabrics, yarns, threads, cords, paper, leather and the like to improve many of their desired proerties or in glazing or embossing operations. In these applications, the condensation products may be used in the unextracted form (as shown in the working examples) or in the extracted form. They are preferably employed in an aqueous medium and in combination with acidic curing agents. However, other media such as solvents or mixtures of water and solvents may be used as well as other types of curing agents. Suitable solvents include, among others, ethyl alcohol, butyl alcohol, isopropyl alcohol, acetone, dioxane, diacetone alcohol, esters, ethers, and ether esters of glycol and glycerol, ethylene dichloride, benzene, toluene and the like and mixtures thereof.

In some cases, it may be desirable to employ the new condensation products in an aqueous emulsions or suspension. Suitable emulsifying agents include the ionic and non-ionic agents, such as, for example, monooleate of sorbitan polyoxyethylene, the trioleate of sorbitan polyoxyethylene, sorbitan tristearate, sorbitan monolaurate, polyoxyethylene ethers of alkylphenols, carboxymethylcellulose, starch, gum arabic, aryl and alkylated aryl sulfonates, such as cetyl sulfonate, oleyl sulfonate, sulfonated mineral oils, and the like, and mixtures thereof. The emusifying agents are generally employed in amounts varying from 0.1% to 10% by weight and more preferably from 1% to 5% by weight.

The amount of the condensation product employed in the aqueous medium for treatment of the fibrous materials may vary over a considerable range depending chiefly on the amount of product to be deposited on the fibrous material and this in turn will depend on the number of applications and the pick-up allowed per application. When the solution is applied but once, with a 90% to 100% pick-up by weight of the fabric in the dry state, a concentration ranging from about .5% to 25% by weight will ordinarily suffice. Preferred concentrations range from about 1.5% to 4%, and particularly 2%. If less than 80% pick-up is permitted, the concentration may, in some cases, go as high as 30% to 50%.

The curing agent employed may be any acidic catalytic material, such as organic and inorganic acids, such as, for example, oxalic acid, lactic acid, succinic acid, acetic acid, maleic acid, phosphoric acid, boric acid, sulfonic acid, perchloric acid, persulfuric acid, p-toluenesulfonic acid, sulfuric acid, and metal salts, such as zinc fluoborate, copper fluoborate, zinc persulfate, cupric arsenite, cupric chloride, cupric chromate, cupric dichromate, cupric fluosilicate, cupric nitrate, zinc nitrate, cupric sulfate, cobaltic chlorostannate, cobaltous fluoborate, cobaltous fluosilicate, cobaltous sulfite, chromic sulfate, chromic nitrate, lead borate, lead chlorate, lead phosphate, barium chlorate, barium phosphate, magnesium fluosilicate, magnesium dichloride, magnesium perchlorate, magnesium nitrate, magnesium fluoborate, magnesium sulfate, manganese sulfate, manganese fluoborate, cadmium arsenate, cadmium borate, cadmium perchlorate, cadmium phosphate, aluminum arsenate, aluminum chlorate, aluminum nitrate, aluminum fluoborate, nickel phosphate, nickel selenate, nickel sulfate, silver sulfate, silver nitrate, silver thiosulfate, stannic fluoborate, strontium chlorate, titanium sulfate, vanadium sulfate, zinc chlorate, zinc fluosilicate, zinc permanganate, zinc phosphate, zinc sulfate, zirconium sulfate, aluminum phosphate, aluminum sulfate, vanadium nitrate, vanadium sulfate, vanadium fluoborate, vanadium selenate, bismuth phosphate, ferric phosphate, ferric pyrophosphate, ferric sulfate, ferrous sulfite, ferrous perchlorate, mercuric arsenate, mercuric chromate, mercuric sulfate, mercurous chloride, mercurous fluoborate, nickel fluoborate, nickel arsenate and the like, and mixtures thereof.

Particularly preferred curing agents are the organic and inorganic of the group consisting of organic mono- and dicarboxylic acids containing up to 10 carbon atoms, inorganic acids containing at least one element of the group consisting of halogen atoms, oxygen, sulfur, nitrogen and phosphorous, and metal salts of metals having an atomic weight between 10 and 240, and acids of the formula

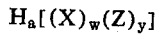

$$H_a[(X)_w(Z)_y]$$

wherein X is a non-metal having an atomic weight above 2, Z is an element which tends to gain from 1 to 2 electrons in its outer orbit, $w$ is an integer, $y$ is an integer greater than 1, and $a$ equals the valency of the radical $(X)_w(Z)_y$.

The amount of the curing agent to be utilized will vary over a wide range depending upon the condensation product selected, the method of cure, etc. Generally, amount used will vary from about .1% to 15% based on the weight of the condensation product. The metal salts and $BF_3$ complexes are preferably employed in amounts varying from about .1% to 8% and the organic acids and inorganic acids are preferably employed in amounts varying from .1% to 10% by weight of the condensation product.

The solution employed to treat the fibrous material may also contain plasticizers to improve their flexibility, though these should not be present in such proportions as to render the finished materials soft or sticky at temperature and humidities to which they would be exposed. It is found, however, that the substances employed in the present invention yield products which are sufficiently flexible for most purposes without the use of plasticizers. Among plasticizers that may be used according to the present invention may be mentioned organic and inorganic derivatives of phenols, for example, diphenylol propane and triphenyl and tricresyl phosphates, sulphonamides, sulphonarylides, alkyl phthalates, for example, diethyl phthalate and glycol phthalates, diethyl tartarate, derivatives of polyhydric alcohols, for example, mono-, di- and tri-acetin, and products obtained by condensing polyhydric alcohols with themselves or with aldehydes or ketones. The compositions may also contain natural resins, e.g., shellac, rosin, and other natural resins and synthetic or semi-synthetic resins, e.g., ester gum, polyhydroxy-polybasic alkyd resins, phenolaldehyde and urea-aldehyde resins.

The new condensation products may also be used in combination with polyepoxides, such as, for example, glycidyl ethers of polyhydric alcohols or phenols.

Textile softening agents, and particularly those of the cationic-type as stearamidoethyl diethyl methyl quaternary ammonium methyl sulphate, trimethyl ammonium methyl sulphate of monostearylmetaphenylenediamine, s-di-1-(2-palmitamidoethyl) urea monoacetate, palmityl amine hydrochloride, and the like, and mixtures thereof, may also be added in varying amounts to improve the feel of the treated fabrics. Other examples of suitable materials include polyethylenes, acrylics, silicones and the like.

The application of the solution containing the condensation product to the fibrous material may be effected in any suitable manner, the method selected depending upon the results desired. If it is desired to apply the solution only to one surface of the material, as, for example, when it is desired to treat the back only of a fabric having a face of artificial or natural silk and a cotton back, the application may be effected by spraying as a liquid or gas or by means of rollers, or the composition may be spread upon the surface by means of a doctor blade. When, however, it is desired to coat both surfaces of the material, or if the material is to be thoroughly impregnated with it, the material may be simply dipped in the solution or run through conventional-type padding rollers. The solutions may also be applied locally to the material, for example, by means of printing rollers or by stencilling.

The amount of the condensation product to be deposited on the fibrous material varies over a wide range depending upon the property or properties to be imparted and the use of the finished material. If treated material is a fabric that is to have a soft feel, such as that intended for use for dresses, shirts, etc., the amount of condensation product deposited will generally vary from 1% to 20% by weight of the fabric. If stiffer materials are required such as for shoe fabrics, draperies, etc. still higher amounts of resins, such as of the order of 25% to 50% by weight may be deposited. If the material is paper and the property to be imparted is wet strength, the amount of material deposited may vary from about .1% to 15% by weight. In determining the amount of condensation product deposited, it should, of course, be remembered that the presence of the condensation product in a few instances causes a slight decrease in tear strength of the material and the amount deposited should be balanced between the desired properties and the desired tear strength.

If the desired amount of the condensation product deposited is not obtained in one application, the solution can be applied again or as many times as desired in order to bring the amount of the condensation product up to the desired level.

After the desired amount of solution has been applied, the treated material is preferably dried for a short period to remove some or all of the dispersing liquid, such as water, alcohol, and the like. This is generally accomplished by exposing the wet material to hot gas at temperatures ranging from 50° C. to 80° C. The period of drying will depend largely on the amount of pick-up permitted during the application of the solution, and the concentration of the condensation product. In most instances, drying periods of from 5 to 30 minutes should be sufficient.

The dried material is then exposed to relatively high temperatures to accelerate the cure. Temperatures used for this purpose generally range from 100° C. to 200° C., and more preferably from 100° C. to 150° C. At these preferred temperature ranges the cure can generally be accomplished in from 3 to 10 minutes. Exposures of less than 3 minutes, e.g., 1 minute, may probably be used in continuous, commercial processing.

After curing, it is desirable in most cases to wash the treated material to remove any soluble materials. A perborate wash is particularly desirable.

The above-described process may be utilized for the treatment of any fibrous material. This includes textile material, such as woven fabrics, non-woven fabrics, threads, yarn, cord, and string, paper, leather, films and the like. These materials may be prepared from natural or synthetic materials, such as cotton, linen, natural silk and artificial silk, such as silk obtained from cellulose acetate or other organic esters or ethers of cellulose, rayons, jute, hemp, animal fibers, such as wood, hair, and the like as well as synthetic materials which includes, among others, those prepared from acrylonitrile (Orlon, 100% acrylonitrile polymer), vinylidene cyanide polymers, polyamides (nylon super polyamide), polyester-polyamides, cellulose esters and ethers, and polymers prepared from corn protein and formaldehyde (zein).

As in the above-noted addition polymers, this includes the homopolymers as well as copolymers and terpolymers, such as, for example, Acrilan (85% acrylonitrile and 15% vinyl acetate), Dynel (60% vinyl chloride and 40% acrylonitrile) and Saran (85% vinylidene chloride and 15% vinyl chloride). Other synthetic fibers include those prepared from polyethylenes and polypropylenes, polyurethanes (Perluran), mineral fibers (Fiberglas) and alginic materials as alginate rayon.

The papers employed in the process of the invention include those prepared from wood, cotton, linen, hemp, jute, mulberry, straw, bamboo, cane fibers or mixtures thereof, by any of the known processes such as the sulfate process, soda process and sulfite process.

The leather employed is preferably cowhide, calfskin or other hides commonly employed in the preparation of leather goods.

The fibrous materials treated may be colorless or may be dyed, printed or otherwise colored to the desired shade. It is also possible to first subject the colorless material to the process of the invention and then apply the desired dye, pigment or other coloring material.

The materials treated according to the above-described process have many improved properties. As noted, the textile materials have improved resistance to creasing and shrinking as well as better resistance to pilling, fraying and snagging and improved dyeability. The paper has better wet strength and tear resistance as well as better abrasion resistance and improved fold endurance. The leather has improved resistance to loss of tanning properties.

The products treated as noted above may be utilized for any of the conventional applications, such as in the manufacture of dresses, drapes, upholsteries, shoe fabrics, carpets, coats, shirts, uniforms, shoes, towels, cords, construction paper, wrapping paper, containers and the like. The use will, in many cases, determine the amount of condensation product to be applied. Thus, less product will be utilized when the material is to be used for making soft goods, such as dresses, shirts and the like than where crispness and fullness is desired, such as in making rugs, drapes, shoe fabrics and the like.

To illustrate the manner in which the invention may be carried out, the following examples are given. It is to be understood, however, that the examples are for the purpose of illustration and the invention is not to be regarded as limited to any of the specific materials or conditions recited therein.

The wrinkle recovery values reported in the examples were determined by the Monsanto Wrinkle Recovery Method (reported as sum of average warp and fill measures), and the tear strength values were determined by the Trapezoid Method ASTM D–39–49. All tests were carried out at 50% relative humidity and 78° F.

The dry crease recovery values were determined on cloth dried at 250° F. The wet crease recovery values were determined by soaking the fabric in water for 30 minutes and then blotting before testing.

EXAMPLE I

This example illustrates the preparation of a condensation product from acrolein and formaldehyde using sulfuric acid as the catalyst, and the superior results obtained by using the condensation product as a crease proofing agent for cotton fabric.

To a suspension of 3.7 mol of formaldehyde (paraformaldehyde) in 150 parts of 30% sulfuric acid was added 1 mol of freshly distilled acrolein. The mixture had a normality of about .8 or a pH of about 1. Temperature rose from 14° C. to 40° C. The mixture was cooled and then held at room temperature for 12 hours by cooling. The mixture was filtered and the clear filtrate neutralized with calcium oxide. Product was then extracted with ether or with chloroform to give a white fluid non-volatile product possessing free OH group and has the following analysis: percent C=44.0; percent H=8.2; OH value eq./100 g.=0.981; carbonylic value=1.749 eq./100 g.

5 parts of the reaction product prepared above was combined with water to form a 5% solution and 5 parts of 50% aqueous solution of magnesium chloride was added as catalyst.

Bleached cotton print (80 x 80 count) cloth was then impregnated with the above-described solution by means of a Butterworth 3 roll laboratory padder. The cloth after padding showed an 80% wet pick up. The impregnated cloth was then dried at 250° F. for 5 minutes and cured at 300° F. for 5 minutes. The finished product was then washed with sodium perborate solution, rinsed three times in warm water to remove any soluble materials and then framed to dimension and dried at 250° F.

The cloth treated in the above-described manner had the same appearance, feel and hand as before the treatment and had excellent shrink resistance and wet and dry crease resistance and excellent scorch resistance. The material had a dry MCRA value (W and F) of 243 compared to a value of 162 for the control (untreated). By AATCC Scorch Test the cloth had a percent reflectance of 79% (81% before test) compared to a value of 80% (82% before test) of untreated cloth.

The excellent resistance to laundering is shown by the fact that the fabric treated in the above-described manner could be washed 20 or more times without material change in the high crease recovery values.

The chlorine retention of the fabric was demonstrated in the following manner. Cotton fabric was placed for 10 minutes in a hypochlorite solution containing 0.4% available chlorine using a bath to cloth ratio of 30–1 and maintained at 140° F. The fabric was then rinsed six times for 5 minutes at 100° F. and dried as smooth as possible. A hot iron at 400° F. was placed on the cloth for 30 seconds. The cloth was then examined to determine the extent of the discoloration and degradation. A dark color indicates charring due to chlorine retention. It was found that the fabric treated by the above-described process had substantially the same color as before the treatment, while a related fabric treated with urea-formaldehyde resin was highly discolored.

Example II

The above-described treatment of the cloth was repeated with the exception that the catalyst employed was 10 part of a 10% aqueous solution of zinc nitrate. In this case, the resulting fabric had a MCRA value of 237.

Example III

To a suspension of 1 mol of formaldehyde (paraformaldehyde) in 150 parts of 30% sulfuric acid was added 1 mol of freshly distilled acrolein. The temperature rose from 21° C. to 44° C. The mixture was cooled and the temperature held at room temperature for 12 hours by cooling. The mixture was neutralized with sodium hydroxide and then filtered.

The above product, without extraction as in the above examples, was combined with water to form a solution having 2% solids. 3 percent of 50% magnesium dichloride aqueous solution was added, and the combined mixture used to pad cotton fabric as in the preceding example. The impregnated sheet was then dried at 250° F. for 5 minutes and cured at 300° F. for 5 minutes. The finished product was washed with sodium perborate and rinsed as in the preceding example. The cloth treated in this manner had the same appearance and feel as before the treatment but had excellent shrink and crease recovery both wet and dry. The material had a dry crease recovery of 250 (W+F) and had 76% retention of original strength. The scorch test gave a value of 79% reflectance (81% before test) as compared to 80% (82% before test) for the control.

Above padding process is repeated using solution having 4, 5, 6, 8, 9 and 10% solids. Related results are obtained.

Example IV

To a suspension of 1 mol of formaldehyde (formalin) in 150 parts of 30% sulfuric acid was added 2 mols of freshly distilled acrolein (normality of about .8 or pH of about 1). The temperature rose to 35° C. and then was held at room temperatnure for 14 hours with cooling. The mixture was filtered and the clear filtrate neutralized with calcium oxide. The product was then extracted with ether and chloroform to give a white, fluid, non-volatile water-soluble product possessing free OH group and had the following analysis: percent C=52.7; percent H 27.8; OH value 0.45 eq./100 g.; carbonylic value=0.82 eq./100 g.

5 parts of the reaction product prepared above was combined with water to form a 5% solution and 10 parts of a 10% aqueous solution of zinc nitrate added as catalyst.

Bleached cotton print cloth was padded with the above solution as in Example I, and the impregnated fabric was then dried, cured and washed as in Example I.

The cloth treated in the above-described manner had the same appearance, feel and hand as before the treatment, and had excellent shrink resistance and crease recovery and excellent scorch resistance. The material had a MCRA value of 244 as compared to a value of 162 for the control. The treated cloth also had no chlorine retentive properties as shown by a test as described in Example I.

Example V

Results similar to those shown in Example IV are obtained by replacing the zinc nitrate in the padding bath shown in Example IV with each of the following catalysts: magnesium chloride, zinc fluoborate, magnesium perchlorate and magnesium sulfate.

Example VI

To a suspension of 1 mol of formaldehyde (formalin) in 150 parts of 30% sulfuric acid was added 2 mols of freshly distilled acrolein. The temperature rose to 38° C. and then was held at room temperature for 16 hours with cooling. The mixture was then neutralized with sodium hydroxide and filtered.

The above product, without extraction as in the above example, was combined with water to form a solution having 2% solids. 5 percent of a 10% aqueous solution of zinc nitrate was then added as catalyst.

Bleached cotton print cloth was padded with the above solution as in Example I, and the impregnated fabric dried, cured and washed as in that example. The finished cloth had a dry crease recovery of 260 (W+F). The scorch test gave a value of 78% reflectance (81% before test) as compared to 80% (82% before test) for the control.

Related results are obtained when the above padding process is repeated using magnesium dichloride as the catalyst. In this case the product had crease recovery value of 240 and retained 80% of original strength.

Example VII

To a suspension of 4 mols of formaldehyde in 150 parts of 50% sulfuric acid was added 1 mol of acrolein. The temperature rose to 40° C. and was kept there with cooling for about 18 hours. The mixture was filtered and the clear filtrate neutralized with sodium hydroxide and saturated with $Na_2SO_4$. The product was filtered and extracted with ether, dried and stripped to give a water-soluble white non-volatile syrup having free OH group.

10 parts of the reaction product prepared above was combined with water to form a 10% solution and 5 parts of zinc fluoborate added as catalyst.

Bleached cotton print cloth was padded with the above solution as in Example I, and the impregnated fabric was then dried, cured and washed as in Example I.

The cloth treated in the above-described manner had the same appearance, feel and hand as before the treatment, and had good shrink and crease resistance.

*Example VIII*

A 5% solution of the condensation product prepared in Example I containing 5% zinc nitrate as catalyst was used to pad sheets of rayon gabardine cloth. The impregnated cloth was dried at 60° C. and cured at 30° F. for 5 minutes. The rayon cloth treated in this manner was quite soft and had increased wrinkle resistance, good washability and excellent shrink resistance.

*Example IX*

This example illustrates the use of the condensation product shown in Example IV for the treatment of woolen fabric to impart shrink resistance.

A 5% solution of the condensation product prepared in Example IV containing 5% magnesium chloride as catalyst was used to impregnate a sheet of woolen fabric by means of a Butterworth 3-roll laboratory padder. The impregnated cloth was dried at 60° C. and cured for 15 minutes at 160° C. The woolen fabric treated in this manner had the appearance as before the treatment and had good strength and improved shrink resistance.

*Example X*

This example illustrates the use of the condensation product shown in Example I for the treatment of paper.

Pieces of unbleached kraft paper was treated with a 10% solution of the condensation product prepared in Example I containing 5% zinc nitrate as catalyst. The sheets were impregnated by means of the laboratory padder as shown in Example I. The treated sheets were dried and heated for 5 minutes at 300° F. The resulting sheets had the same feel and appearance as before the treatment and displayed excellent resiliency, good fold endurance, good absorbency and high wet tensile strengths and burst strengths.

*Example XI*

This example illustrates the use of the condensation product in treating paper in the beater stage.

Unbleached kraft paper pulp was beaten in a "Valley" beater in the usual manner and made into an 0.6% water suspension. A portion of the aqueous solution of the condensation product shown in Example I containing 5% zinc nitrate was added to the paper pulp suspension so as to give a solution having 3% resin based on the weight of the paper pulp. This suspension was then made into a paper sheet and the sheet dried for a few minutes at 60° C. The dried sheet was then heated for 5 minutes at 300° F. The resulting sheet appeared as normal paper but displayed excellent resiliency, good fold endurance, good absorbency and good wet strength.

Related results are obtained by replacing the zinc nitrate catalyst with each of the following: magnesium chloride, zinc fluoborate, magnesium perchlorate and zinc sulfate.

*Example XII*

Pieces of acetone dehydrated hide, amounting to about 15 parts, were placed in a 5% solution of the condensation product prepared in Example I and zinc nitrate as the curing agent. The hide in contact with this solution was gently agitated at room temperature. The hide was then removed, dried and heated to cure the condensation product. The leather had good resistance to detanning by treatment with acids and alkali.

*Example XIII*

To a suspension of 1 mol of formaldehyde (formalin) in 150 parts of 30% sulfuric acid was added 1 mol of aldol (2-hydroxybutyraldehyde). The temperature rose to about 40° C. The mixture was cooled and held at room temperature for 12 hours by cooling. The mixture was neutralized with calcium oxide and the product filtered.

The above solution containing the condensation product of formaldehyde and the 2-hydroxybutyraldehyde is then applied to white cotton fabric as in Example III. Related results are obtained.

*Example XIV*

To a suspension of 1 mol of glutaraldehyde in 150 parts of 30% sulfuric acid was added 1 mol of freshly distilled acrolein. The temperature rose to about 30° C., and then the mixture was cooled to room temperature and kept there for about 16 hours. The resulting mixture was then neutralized with calcium oxide and the product filtered.

The above solution containing the condensation product of glutaraldehyde and acrolein is then applied to white cotton fabric as in Example III. Related results are obtained.

*Example XV*

To a suspension of 1 mol of formaldehyde (formalin) in 150 parts of 30% sulfuric acid is added 1 mol of 3-aminopropionaldehyde. The temperature rose to about 50° C. and the mixture is cooled to room temperature and kept there for about 12 hours. The resulting mixture is then neutralized and filtered.

The above solution containing the condensation product of formaldehyde and 3-aminopropionaldehyde is then applied to white cotton fabric as in Example III. Related results are obtained.

Related condensation products are obtained by replacing the 3-aminopropionaldehyde with equal molar amounts of each of the following: 2-aminobutyraldehyde, 3-mercaptobutyraldehyde, 3-mercaptopentanal and crotonaldehyde.

We claim as our invention:

1. A process for treating fibrous materials to improve their properties which comprises contacting the fibrous material with an aqueous solution of (1) a previously neutralized reaction product of (a) an aldehyde having attached to a carbon atom involving the alpha to beta carbon atom relative to the

group a member of the group consisting of a —OH, —SH and —NH$_2$ radical and a carbon-to-carbon unsaturated linkage, and (b) a dissimilar aldehyde containing

as the only reactive group, prepared under acidic conditions, and (2) an acid acting catalyst, and heating to effect cure, with the proviso that when the aldehyde defined in (a) is an unsaturated aldehyde in the presence of water, the aldehyde defined in (a) and the aldehyde defined in (b) are combined in a mol ratio varying from 8:1 to 1:8.

2. A process for treating textile fabrics to impart crease and shrink resistance which comprises impregnating the textile fabric with an aqueous solution of (1) a previously neutralized reaction product of acrolein and formaldehyde in a mol ratio varying from 8:1 to 1:8 prepared under acid conditions in the presence of water, and (2) an acid acting catalyst, and heating to effect cure.

3. A process as in claim 2 wherein the textile material is a cellulosic textile material.

4. A process as in claim 2 wherein the textile material is a woolen fabric.

5. A process as in claim 2 wherein the acid-acting catalyst is zinc nitrate.

6. A process as in claim 2 wherein the acid-acting catalyst is a magnesium salt.

7. A process for treating cotton fabric to impart crease and shrink resistance which comprises impregnating the cotton fabric with an aqueous solution of (1) a previously neutralized reaction product of acrolein and formaldehyde in a mol ratio of 4:1 to 1:4 under acidic conditions and in the presence of water, and (2) a metal salt catalyst, and heating to effect cure.

8. A fibrous material obtained by the process of claim 1.

9. A process for treating textile fabrics to impart crease and shrink resistance which comprises impregnating the textile fabric with an aqueous solution of (1) a previously neutralized reaction product of (a) an aldehyde having attached to a carbon atom involving the alpha to beta carbon atom relative to the

group an OH group, and (b) formaldehyde, prepared under acidic conditions, and (2) an acidic catalyst, and heating to effect cure.

10. A process for treating textile fabrics to impart crease and shrink resistance which comprises impregnating the textile fabric with an aqueous solution of (1) a previously neutralized reaction product of (a) an aldehyde having a carbon-to-carbon unsaturated linkage in the alpha,beta position relative to the

group, and (b) formaldehyde, in a mol ratio varying from 8:1 to 1:8 prepared under acidic conditions and in the presence of water, and (2) an acidic metal salt catalyst, and heating to effect cure.

11. A process for treating leather which comprises contacting the leather with an aqueous solution of (1) a previously neutralized reaction product of (a) an aldehyde having attached to a carbon atom involving the alpha to beta carbon atom relative to the

group a member of the group consisting of a —OH, —SH and —NH₂ radical and a carbon-to-carbon unsaturated linkage, and (b) a dissimilar aldehyde containing a

group as the only reactive group, prepared under acidic conditions, and (2) an acid acting catalyst, and heating to effect cure, with the proviso that when the aldehyde defined in (a) is an unsaturated aldehyde in the presence of water, the aldehyde defined in (a) and the aldehyde defined in (b) are combined in a mol ratio varying from 8:1 to 1:8.

12. A process for treating paper which comprises contacting the paper with an aqueous solution of (1) a previously neutralized reaction product of (a) an aldehyde having attached to a carbon atom involving the alpha to beta carbon atom relative to the

group a member of the group consisting of a —OH, —SH and —NH₂ radical and a carbon-to-carbon unsaturated linkage, and (b) a dissimilar aldehyde containing a

group as the only reactive group, prepared under acidic conditions, and (2) an acid acting catalyst, and heating to effect cure, with the proviso that when the aldehyde defined in (a) is an unsaturated aldehyde in the presence of water, the aldehyde defined in (a) and the aldehyde defined in (b) are combined in a mol ratio varying from 8:1 to 1:8.

References Cited by the Examiner

UNITED STATES PATENTS

| 2,696,477 | 12/54 | Gagarine et al. | 260—602 |
|---|---|---|---|
| 2,771,337 | 11/56 | Gagarine et al. | 8—116.4 |
| 2,785,949 | 3/57 | Kress. | |
| 3,080,281 | 3/63 | Fischer et al. | 8—94.33 |

FOREIGN PATENTS 547,846   9/42   Great Britain.

NORMAN G. TORCHIN, *Primary Examiner.*

JOHN R. SPECK, JOHN H. MACK, MORRIS O. WOLK, A. LOUIS MONACELL, *Examiners.*